Patented Nov. 26, 1946

2,411,762

UNITED STATES PATENT OFFICE 2,411,762

9,10-EPOXYOCTADECANOL AND PROCESS FOR ITS PREPARATION

Daniel Swern, Philadelphia, Pa., assignor to United States of America, as represented by the Secretary of Agriculture No Drawing. Application December 8, 1944, Serial No. 567,297

2 Claims. (Cl. 260—348)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to oxidation products of olefinic alcohols and, in particular, to the oxidation product of oleyl alcohol and perbenzoic acid, and has as its object the production of 9,10-epoxyoctadecanol.

According to the invention, oleyl alcohol and perbenzoic acid are reacted together to form a new compound, namely 9,10-epoxyoctadecanol, as illustrated by the following equation:

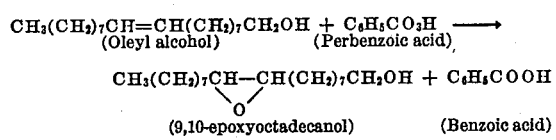

The following is an example of the manner of preparation of this new compound:

To 3140 ml. of acetone at about 0° C. to 5° C. and containing 138 grams of perbenzoic acid is added 274 grams of oleyl alcohol. The solution is then allowed to stand for about 40 hours at room temperature and then cooled to about $-25°$ C. The precipitate obtained is then filtered off and dried. It is found to weigh about 247 grams (89% yield) and has a melting point of about 54° C. to 55.5° C. Analysis of this material for epoxy oxygen gives the following results:

Calculated for 9,10-epoxyoctadecanol: 5.62% epoxy oxygen; found: 5.57% epoxy oxygen.

The new compound, 9,10-epoxyoctadecanol, is useful as an intermediate in organic synthesis, particularly in the fields of plastics and surface-active agents.

Having thus described the invention, what is claimed is:

1. 9,10-epoxyoctadecanol.
2. A process of preparing 9,10-epoxyoctadecanol, comprising reacting oleyl alcohol with a solution of perbenzoic acid in acetone at about 0° C. to 5° C., then permitting the resulting solution to stand for about 40 hours at about room temperature, then cooling this solution to about $-25°$ C. to form a precipitate which comprises mainly 9,10-epoxyoctadecanol, and then isolating the formed precipitate.

DANIEL SWERN.